Dec. 31, 1957     C. F. MICKEY ET AL     2,818,185
DISPENSER TRUCK BODY FOR BEER KEGS
Filed July 31, 1956     4 Sheets-Sheet 1
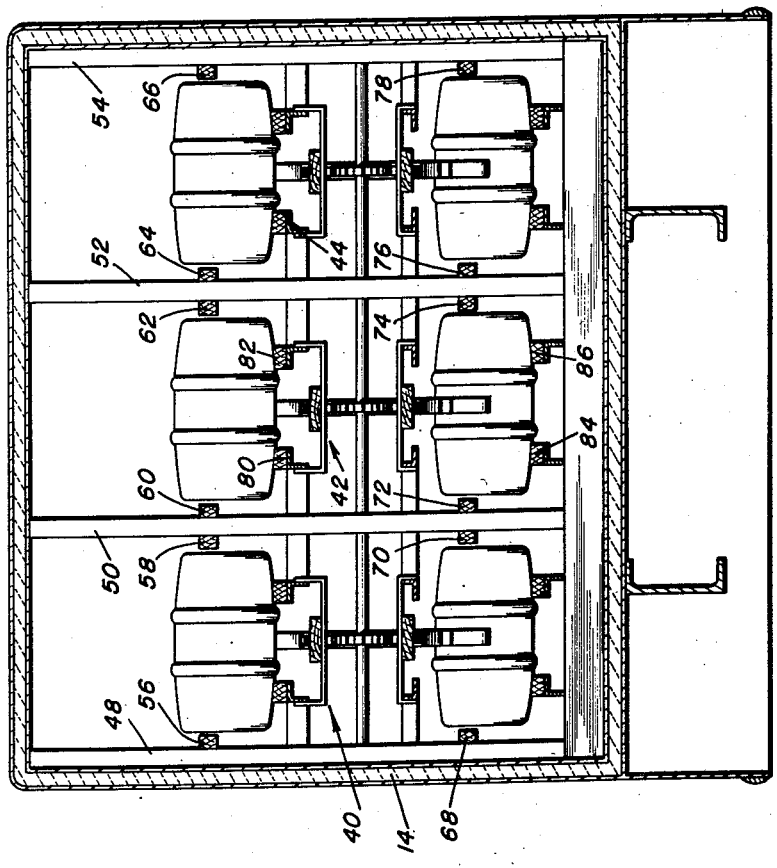
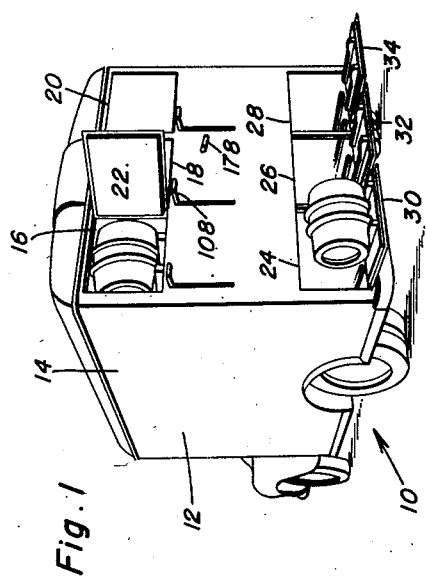
Carl F. Mickey
Lawrence E. Mickey
INVENTORS.

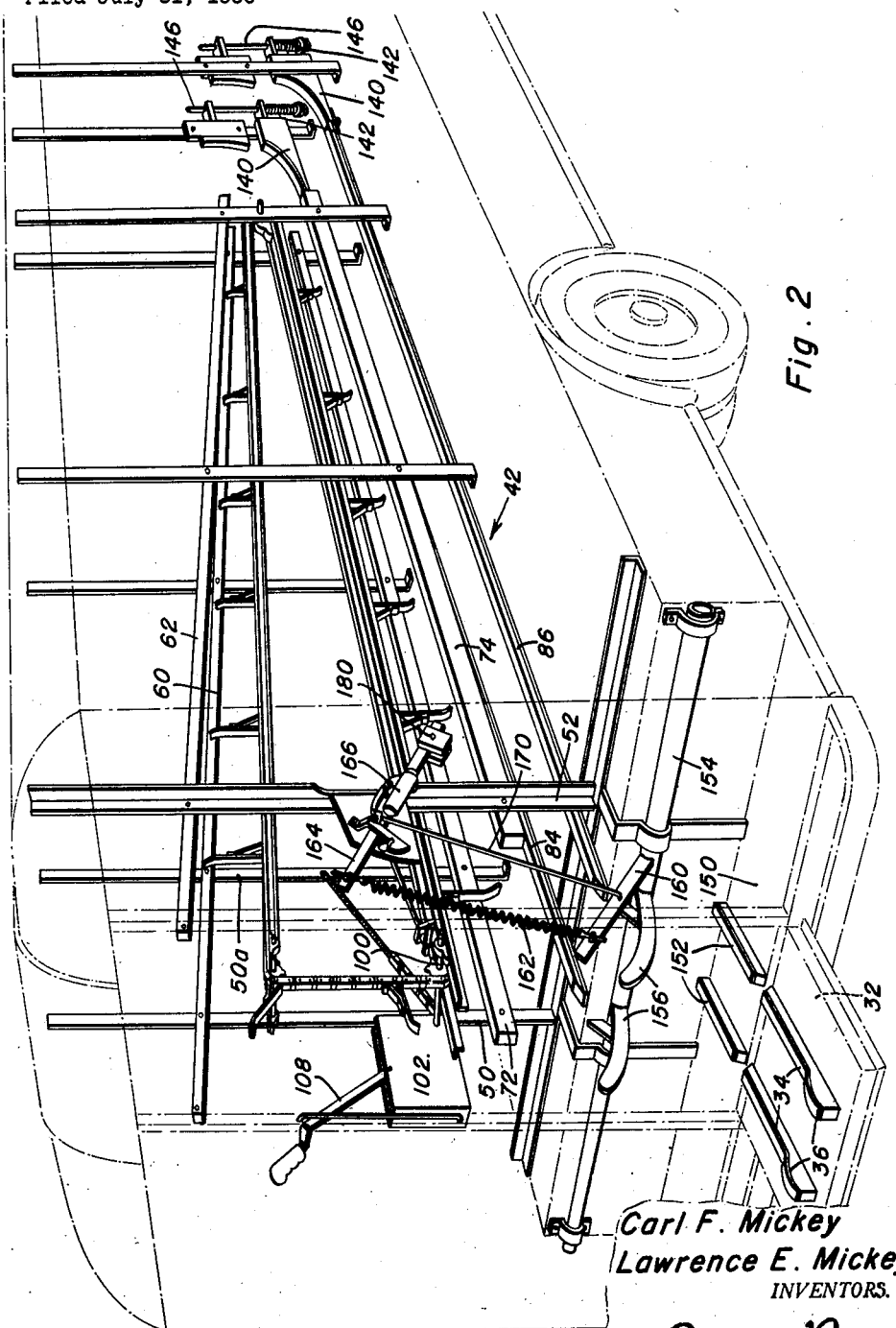

Dec. 31, 1957   C. F. MICKEY ET AL   2,818,185
DISPENSER TRUCK BODY FOR BEER KEGS
Filed July 31, 1956   4 Sheets-Sheet 3

Carl F. Mickey
Lawrence E. Mickey
INVENTORS.

BY
Attorneys

Dec. 31, 1957  C. F. MICKEY ET AL  2,818,185
DISPENSER TRUCK BODY FOR BEER KEGS
Filed July 31, 1956  4 Sheets-Sheet 4

Carl F. Mickey
Lawrence E. Mickey
INVENTORS.

BY *[signatures]*
Attorneys

United States Patent Office 2,818,185
Patented Dec. 31, 1957

2,818,185

DISPENSER TRUCK BODY FOR BEER KEGS

Carl F. Mickey and Lawrence E. Mickey,
High Point, N. C.

Application July 31, 1956, Serial No. 601,147

1 Claim. (Cl. 214—83.2)

This invention relates to the class of vehicles and more particularly to a novel dispenser truck body for beer kegs.

The primary object of the present invention resides in the provision of a dispenser truck body for beer kegs to facilitate loading and unloading of beer kegs by loading and unloading from the outside by means of racks and a chain to control and release the beer kegs.

A further object of the invention resides in the provision of a truck body which is so arranged as to enable beer kegs to be placed in the truck body through a raised opening and which will permit the dispensing of the beer kegs in a convenient manner with complete control so that the beer kegs may be removed or replaced with a minimum possibility of accidents which may result in injuries to persons loading or unloading the beer kegs.

An additional object of the present invention resides in the provision of means for lowering either full or empty beer kegs whereby the empty beer kegs may be quickly lowered by means of a spring mechanism yet which includes a shock absorbing means for slowly and safely lowering full beer kegs.

It is to be recognized that the arrangement of parts incorporated in the invention may be utilized for the loading, conveying, and dispensing of other types of goods besides beer kegs, the invention being primarily adapted for use in conjunction with goods which are usually packed in barrels, kegs, or the like.

Still further objects and features of this invention reside in the provision of a dispenser truck body for beer kegs that is strong and durable, simple in construction and relatively inexpensive to manufacture, and which is adapted to facilitate the storage and conveyance of a large number of beer kegs in a convenient manner.

These, together with the various ancillary objects and features of the invention which will become apparent as the following description proceeds, are attained by this dispenser truck body for beer kegs, a preferred embodiment of which has been illustrated in the accompanying drawings, by way of example only, wherein:

Figure 1 is a perspective view of a dispenser truck body constructed in accordance with the concepts of the present invention;

Figure 2 is a partial perspective view of the dispenser truck body illustrating one of the sets of racks utilized in the invention;

Figure 4 is a vertical sectional view as taken along the plane of line 4—4 in Figure 3;

Figure 6:
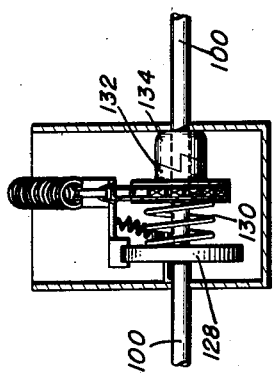
Figure 8:
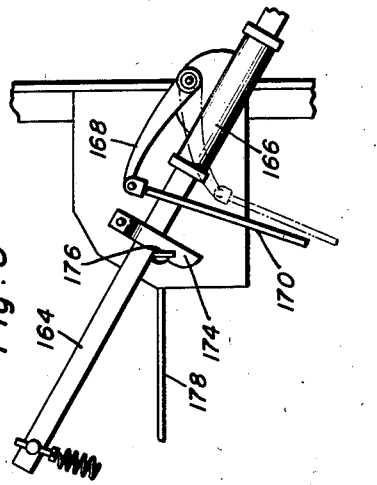
Figure 5:
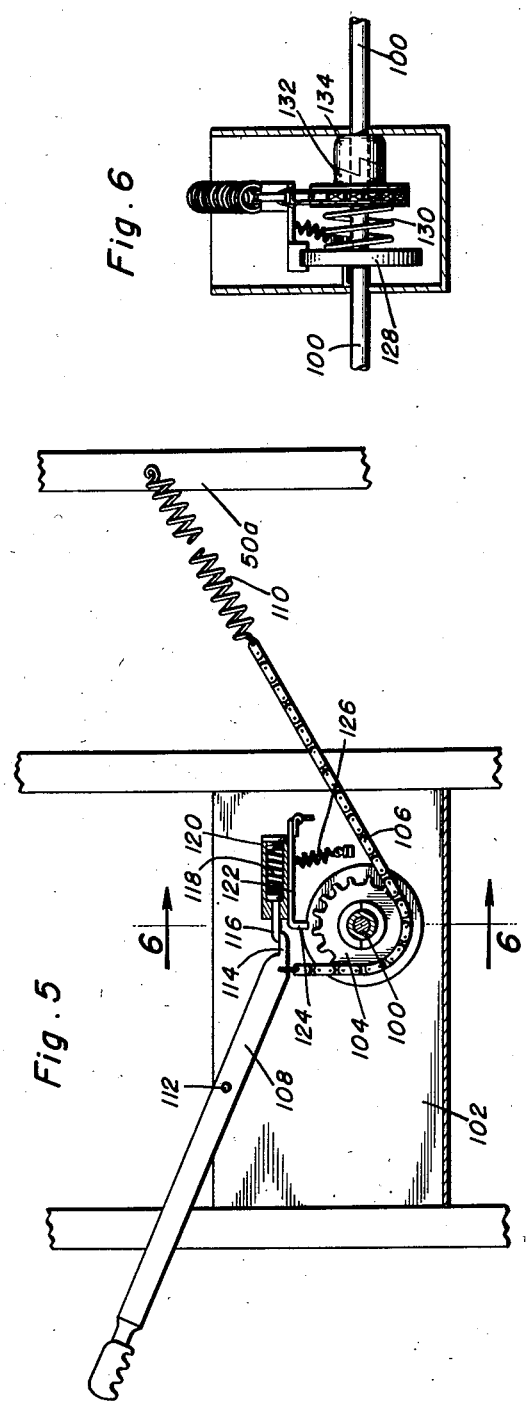
Figure 7:
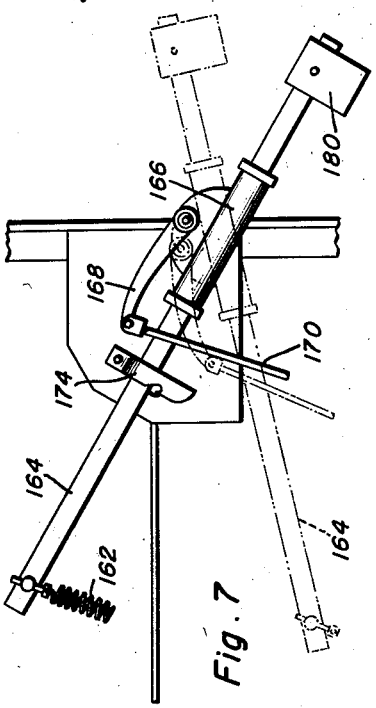

Fgure 5 is a partial sectional view illustrating the construction of the means for actuating the conveyor chains utilized in the invention;

Figure 6 is a sectional detailed view as taken along the plane of line 6—6 in Figure 5;

Figure 7 is a partial elevational detailed view of the combined spring means and shock absorbing means utilized when lowering the beer kegs and showing in phantom lines the position of the spring means utilized for returning the cradle to a raised position; and Figure 8 is a view similar to that shown in Figure 7 illustrating the arrangement of parts in phantom lines when lowering a full beer keg.

With continuing reference to the accompanying drawings wherein like reference numerals designate similar parts throughout the various views, and with initial attention directed to Figure 1, reference numeral 10 generally designates the vehicle comprising the present invention. This invention includes a truck body 12 in the form of a housing 14 having a series of upper openings 16, 18 and 20 therein which are normally closed by doors such as is indicated at 22. Below the openings 16, 18 and 20 are openings 24, 26, and 28 for dispensing beer kegs or the like and these openings 24, 26 and 28 are normally closed by hinged doors 30, 32 and 34 which pivot downwardly to a horizontal position and may be maintained in the horizontal position by any suitable mounting arrangement. Mounted on each of the doors such as indicated at 32 in Figure 2, are tracks 34 which have stops 36 for maintaining a beer keg on the door 32.

Figure 3:
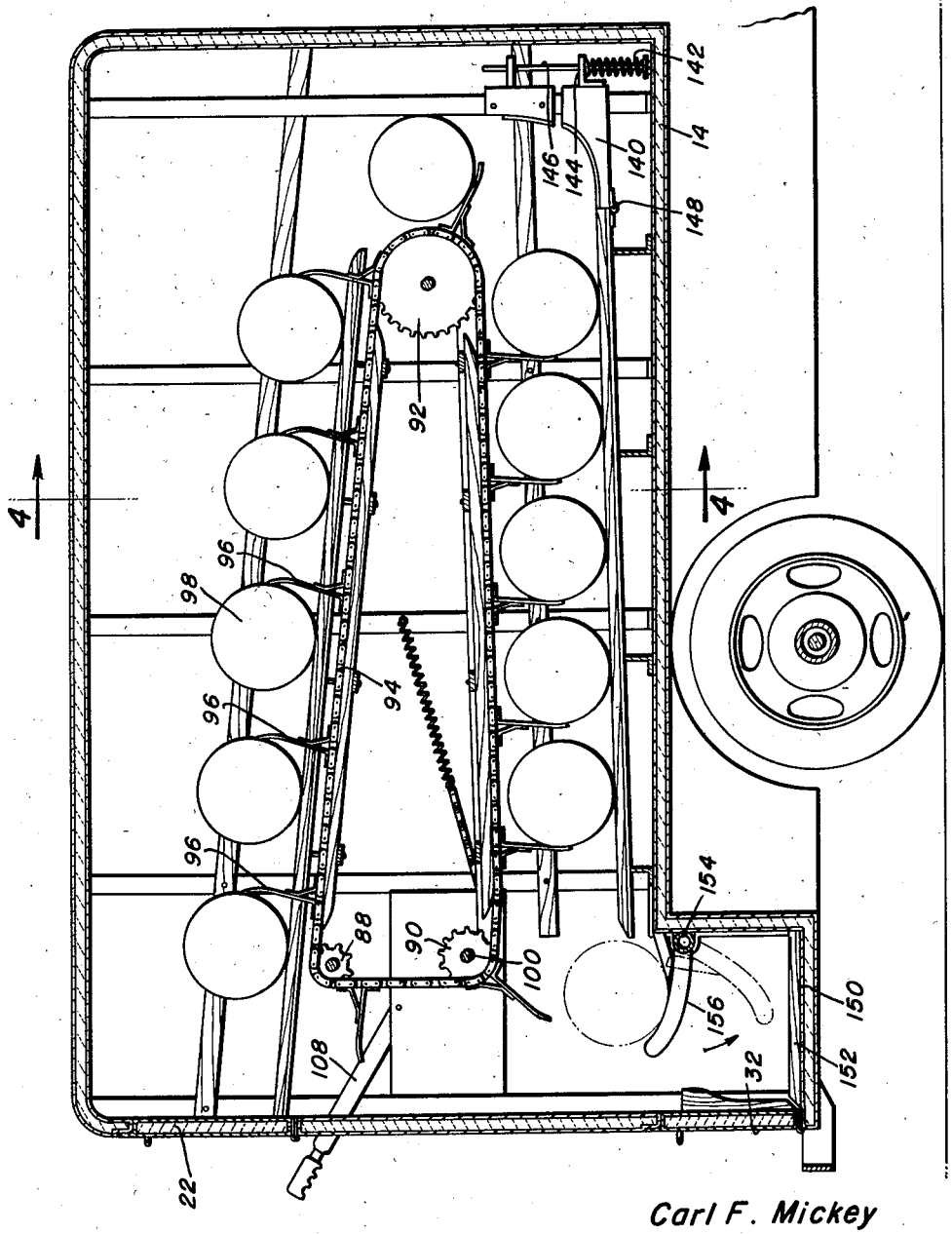
Figure 3 is a longitudinal sectional detailed view of the dispenser truck body.

Mounted within the truck body as can be best seen in Figure 4, are three sets of racks which are generally indicated by reference numerals 40, 42 and 44, it being noted that in Figures 2 and 3 only the set of racks 42 is shown, with certain of the supports therefor being not shown for clarity. In Figure 3, only the set of racks 42 are clearly visible.

It is to be recognized that the housing 14 of the truck body may be suitably insulated as desired. Thus, if it is desired, the truck body 12 may be refrigerated or in fact heated. As can be seen best in Figure 4, the various sets of racks 40, 42 and 44 are separated by a series of vertical members 48, 50, 52, 54, etc. These vertical members carry horizontal spacers arranged in the form of upper sets as indicated at 56, 58, 60, 62, 64 and 66 as well as a lower set of side spacers 68, 70, 72, 74, 76 and 78.

In order to better understand the invention, only the set of racks 42 need be considered. The set of racks 42 includes a pair of downwardly and forwardly slanting trackets 80 and 82 which terminate short of the forward end of the housing 14. Further, a pair of lower downwardly and rearwardly extending tracks 84 and 86 are positioned beneath the tracks 80 and 82. As can be seen best in Figures 3 and 4, mounted and entrained about sprocket wheels 88, 90 and 92 is an endless chain conveyor 94. This endless chain conveyor carries spaced spacer fingers 96 which spacer fingers are adapted to engage and hold beer kegs or barrels as at 98 in spaced relationship from each other and to prevent the forces of gravity as applied on the barrels from moving the barrels downwardly unless the chain 94 is actuated. Means are, of course, provided for actuating the chain 94. It is noted that the sprocket wheel 90 is mounted on a shaft 100. This shaft 100 extends into a casing 102 on which another sprocket wheel 104 is mounted. This sprocket wheel 104 is engaged by a chain 106 which is attached at one end to an operating lever 108. The other end of the chain is connected by means of a spring 110 to the vertical member 50a. The operating lever 108 is pivoted as at 112 and has a lug 114 integrally formed therewith adapted to engage a detent 116 which is spring pressed by means of a spring 118 to an extended position. The spring pressed detent 116 is mounted within a cylinder 120 carried by a finger 122 which has a portion 124 engageable with the sprocket 104. A spring 126 normally urges the pawl 124 into engagement with the sprocket 104. A collar 128 is also mounted on the shaft 100 and a spring 130 biases the collar 128 and the sprocket 104 which carries a clutch member 132 into engagement with another clutch member 134 carried by another portion of the shaft 100. Hence, upon depression of the operating lever 108, the chain 106 is pulled by the sprocket 104 driving the sprocket in a first direction. This is transmitted through the clutch assembly including members 132 and 134 so as to rotate the shaft 100 and the sprocket 90 mounted thereon. However, release of the operating lever 108 will cause the spring 126 to move the pawl 124 into locking engagement with the sprocket 104 and movement of the chain 106 as the lever 108 is returned to its initial position will while causing the sprocket 104 to rotate not be transmitted to the sprocket 90 due to the overriding effect of the clutch members 132 and 134 depressing spring 130 so as to permit clutch action.

As the operating lever 108 is operated, it will cause movement of the chain conveyor 94 so as to move each keg successively. Adjacent the forward end of the housing there is provided a shock absorbing mounting 140 of a suitable configuration whereby a spring 142 is provided for taking the shock of the lowering of a beer keg from the upper set of tracks 80 and 82 to the lower set of tracks 84 and 86. This shock absorber mounting 140 is mounted for vertical movement by means of an angle-shaped member 144 which has the shaft or rod 146 extending therethrough, the base of the housing 14 and the angle member 144 being biased by the spring 142. This member 140 may be hinged as at 148 to the lower tracks 84 and 86 and, as can be best seen in Figure 2, is formed of two identical portions.

Mounted adjacent the opening 26 but forwardly spaced therefrom and a portion somewhat raised above the platform 150 having tracks 152 thereon is a shaft 154 carrying arms 156 adapted to receive a beer keg from the lower rearward edge of the lower tracks 84 and 86. The shaft 154 has a lever 160 welded or otherwise affixed thereto. The lever 160 has one end of a spring 162 attached thereto, the other end of the spring being affixed to an operating lever 164 of a combined spring and shock absorbing system for lowering beer kegs. This device can be best seen in Figures 7 and 8. Mounted on the operating lever 164 is a hydraulic cylinder 166 forming a dash-pot like control for a movable arm 168, the position of the arm 168 being controlled by the position of the piston within the cylinder 166. A link 170 interconnects the arm 168 and the lever 160.

A latch 174 is provided for engaging a pin 176 on an operating handle 178 mounted on the rear of the truck body, see Figure 1, which operating handle 178 when in the latched position will prevent pivotal movement of the operating lever 164. The operating lever 164 has a counterweight 180 attached thereto. In operation, when it is desired to lower an empty beer keg, the latch 176 controlled by the operating rod 178 is released. Hence, when the beer keg hits the arms 156 as it is moved from the lower tracks 84 and 86, the spring 162 will be tensioned and the operating lever 164 will be pivoted from the position shown in solid lines in Figure 7 to the position as is shown in dotted lines in Figure 7. In this arrangement, the counterweight 180 will be moved upwardly absorbing a part of the energy which is also being absorbed by the spring 162 and will be effective in lowering a keg. However, when it is desired to lower a full beer keg, the operating lever 164 is latched in the position shown in solid lines in Figure 8. Then, the link 170 will pull upon the arm 168 which is then moved to the position as is shown in phantom lines in Figure 8 due to the dash-pot effect of the hydraulic cylinder 166 controlling movement of the arm 168.

From the foregoing, the operation of the invention is quite apparent. When transporting full beer kegs from one location to another the full beer kegs are placed in the upper openings. Then, successive operations of the conveyor chains will move the beer kegs to a position where they can be successively dispensed upon movement of the truck from one stop to another. The beer kegs may be successively dispensed with the latching handle 178 in a latched position utilizing the dash-pot effect of the cylinder 166. If empty kegs are subsequently substituted for the full beer kegs, when it is desired to dispense these empty beer kegs, the operating lever 164 is unlatched.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

A dispenser truck body comprising a housing, downwardly sloping racks mounted in said housing, said housing having at least one upper opening for depositing kegs on said racks and at least one lower opening for removing kegs from said housing, said racks including at least one upper set of racks extending downwardly and forwardly with respect to said housing and at least one lower set of racks extending downwardly and rearwardly with respect to said housing, said lower set of racks being disposed beneath said upper set of racks, at least one conveyor disposed adjacent but spaced from said racks, spacer fingers secured to said conveyor for maintaining kegs in spaced relationship, and manually operable means for actuating said conveyor, said conveyor comprising an endless chain, a platform in said housing below said racks, shock absorbing means for lowering a full keg from said racks onto said platform, and spring means for lowering an empty keg from said racks onto said platform.

References Cited in the file of this patent
UNITED STATES PATENTS

| | | |
|---|---|---|
| 715,560 | Dedrick | Dec. 9, 1902 |
| 1,088,980 | Goble | Mar. 3, 1914 |
| 1,999,066 | Stenfors et al. | Apr. 23, 1935 |
| 2,088,078 | Zimicki | July 27, 1937 |
| 2,146,533 | Erickson | Feb. 7, 1939 |
| 2,244,524 | Lima | June 3, 1941 |
| 2,559,318 | Rice et al. | July 3, 1951 |
| 2,670,861 | Fondriest et al. | Mar. 2, 1954 |

FOREIGN PATENTS

| | | |
|---|---|---|
| 16,515 | Netherlands | June 16, 1927 |